April 19, 1932.  A. A. DICKE  1,854,786
THERMOSTAT
Original Filed Nov. 17, 1928
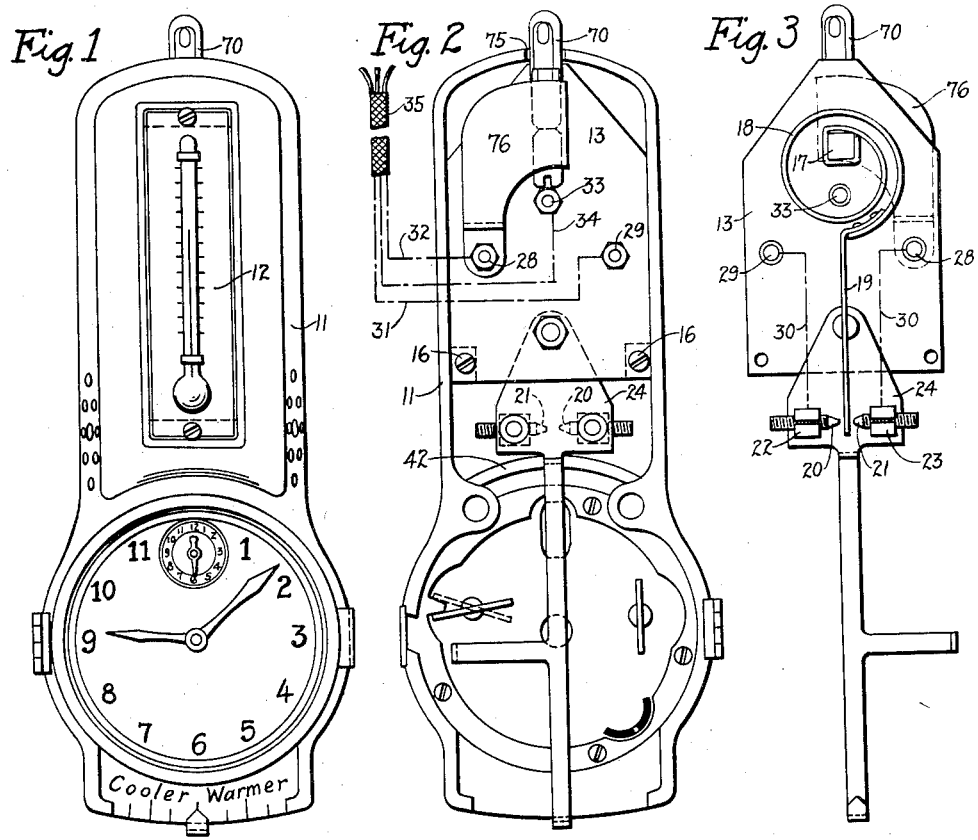
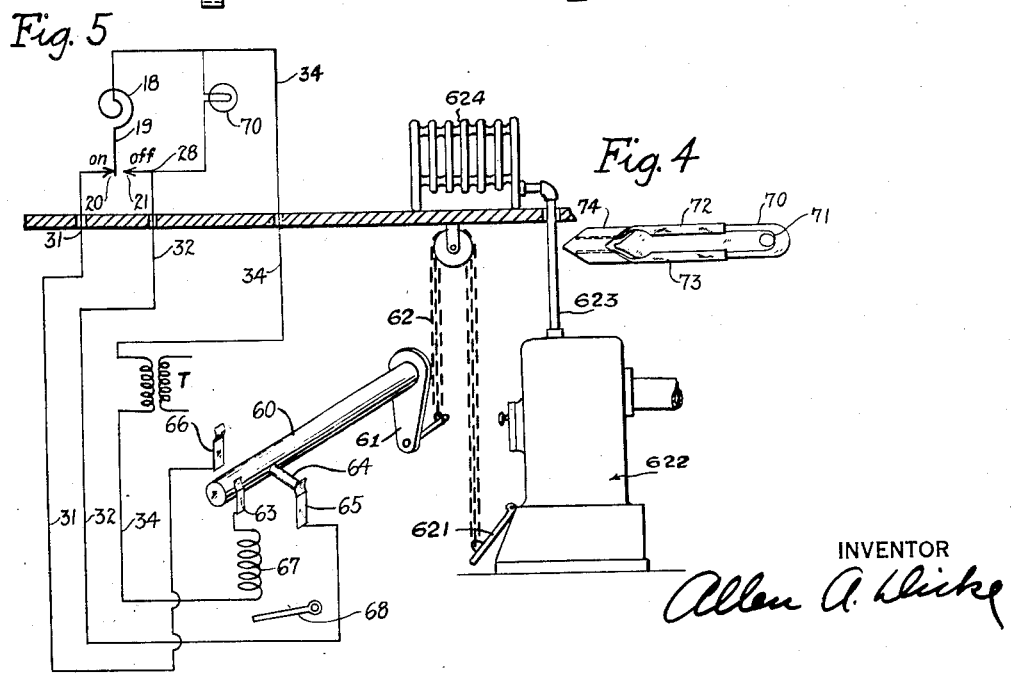
INVENTOR
Allen A. Dicke Patented Apr. 19, 1932

1,854,786

UNITED STATES PATENT OFFICE

ALLEN A. DICKE, OF MONTCLAIR, NEW JERSEY, ASSIGNOR TO PIONEER HEAT REGULATOR CORPORATION, A CORPORATION OF NEW JERSEY

THERMOSTAT

Application filed November 17, 1928, Serial No. 320,015. Renewed January 2, 1932.

My invention relates to improvements in thermostats of the type usually employed in connection with damper controlling mechanism operatively connected with a heating plant or furnace for heating apartments, dwellings, and other buildings, or with controlling mechanism for valves for heating or cooling systems or in other connections, the movement of the thermostatic element under changes of temperature in the apartment or other place where the thermostat is situated being caused to control, as by electric circuits, such damper or valve controlling mechanisms.

It is an object of the present invention to provide supplemental heating means adapted to slightly increase the temperature of the thermo responsive element at certain times so as to provide for closer regulation of the temperature.

A further object is to provide a tell-tale light or other indicator to show when the regulating system is in a certain condition of adjustment.

Another object is to secure said heating effect and said indication by a single means, as by using a small electric lamp.

Further objects are to provide such supplemental heating means in a temperature regulating system which is normally static, i. e., where there are no parts in motion except when the combustion means are being adjusted from one rate of operation to another; to provide such supplemental heating in a thermostat of the type having a movable contact making element cooperating with a plurality of contacts to establish one of a plurality of circuits; to provide such supplemental heating and indicating means in a thermostat provided with an enclosing casing and generally to improve thermostats and heat regulating systems.

In the illustrative form of the invention herein disclosed it is shown as applied to a thermostat of the construction shown in my pending application S. N. 231,885, filed November 8, 1927. It is to be understood, however, that many of the advantages of the present invention can be realized when applied to thermostats of other construction, including known thermostats which impart control to the damper or valve controlling mechanism through electric or other means.

In the accompanying drawings, forming part of the specification,

Fig. 1 is a front elevation, of one illustrative form of embodiment of the present invention;

Fig. 2 is a rear elevation thereof;

Fig. 3 is a front view of part of the mechanism;

Fig. 4 shows the lamp bulb shown in Figs. 1, 2, and 3;

Fig. 5 is a diagram showing schematically a heat regulator system utilizing the present invention.

In said drawings the numeral 11 represents the main frame which is preferably made of a casting of iron or other metal or alloy or any unmetallic plastic material like bakelite. The upper part thereof projects forwardly to form a mechanism casing and preferably bears on its front face a thermometer 12 having the usual tube and temperature scale as shown. The lower part, preferably of ring form, serves to support a clock in a manner and for a purpose having no special relation to the present invention. The thermoresponsive and electrical mechanism is preferably carried by a back plate 13 which may be supported on suitable lugs, being clamped thereto as by screws 16.

This back plate carries in electrical contact therewith a post 17 which may be of square cross-section, as shown, which post serves to support a section of bimetallic or other thermoresponsive material 18 which carries a metal finger or blade 19, the lower end of which is located between the two contacts 20 and 21 mounted on posts 22 and 23, respectively, mounted in insulated relation on a lever 24, pivoted at 25 to the back plate 13. The lower part of the lever 24 is arranged in any suitable way to play over a temperature scale as shown.

It will be seen that as the pointer 27 is moved over the scale it will move the contacts 20 and 21 in relation to the finger 19. To provide a convenient flexible electrical connection between the movable posts 22 and 23 and the cable leading to the motor, the back plate is preferably provided with two binding posts 28 and 29 mounted on the back plate in insulated relation. These binding posts are connected to the contact supporting posts 22 and 23 by flexible conductors 30. Connected to the binding posts 28 and 29 are the conductors 31 and 32. A third binding post 33 is provided, grounded to the plate 13. The three conductors are preferably formed into a cable 35 which leads to the motor, the operations of which are to be controlled.

Due to the arrangement and action of the thermoresponsive element 18, which may be of the usual bimetallic type or its equivalent, the blade 19 moves to the right when the temperature rises and to the left when the temperature drops. When the temperature rises contact is made with contact point 21 thus establishing a circuit through conductors 32 and 34, resulting in the operation of the distant motor to reduce the drafts or to reduce the gaseous, liquid or solid fuel supply. Likewise, a drop in the temperature establishes contact between blade 19 and contact 20, providing a circuit through conductors 31 and 34, causing the distant motor to operate to increase the heat supply.

The bottom of the casing is partly closed by the wall 42. Circulation of air through the casing and about the element 18 is provided for. It may enter to the rear of the wall 42 and leave through openings at the top of the casing.

Means are provided for adjusting the lever 24 under control of the clock 50, but this not being a part of the present invention it is not deemed necessary to describe said means, especially as it is fully described in my said pending application.

The construction described so far is all substantially the same as that disclosed in said pending application. The new construction will now be described.

As the heater and/or indicating lamp is to be turned on when the motor is in one position (drafts open) and turned off when drafts are closed, some provision must be made for controlling the circuit from the motor. This could be done by adding a contact brush in the motor and running another conductor upstairs to the thermostat. This would, however, involve special construction in the motor and an extra conductor. It is an object of the present invention to avoid this special motor construction and extra conductor.

Fig. 5 shows the wiring diagram of a usual thermostatic heat regulator system and represents a preferred embodiment of the present invention. The conductors 31, 32, and 34 lead to the basement where a transformer or other electric power source is connected in series with the conductor 34 as shown at T. 60 may represent schematically the operating shaft of any usual damper regulator motor (such as the motor shown in patent to Mack No. 680,262, granted August 13, 1901) having a crank 61 for operating a chain 62 connected to the damper or other combustion regulating device $62_1$ of the furnace or other heat source $62_2$. The heat developed in the furnace is transmitted to the apartment to be heated by suitable means as steam pipe $62_3$ leading to radiator or the like $62_4$. The electromagnet 67, which serves when energized to release the motor for a half turn operation by attracting an armature as 68, is connected at one end to conductor 34 and at the other end to the shaft 60 as at 63. A commutator is provided in such motor to place the electromagnet under the control of one or the other of the two regulating circuits, this being shown as a projection 64 bearing on one or the other of the two brushes 65 and 66, to which are connected the conductors 32 and 31, respectively. In the position shown, the drafts are "on" and the projection 64 is in contact with brush 65 in readiness to turn the drafts "off". The present invention takes advantage of this usual construction, shown in said Patent No. 680,262 and so many other patents that the schematic outline shown and described will be clear to any person skilled in this art, without further description or illustration. It has been discovered that the lamp or heater may be connected across from conductor 34 to conductor 32 if the lamp is of sufficiently high resistance. The lamp 70 is shown as connected in this way in Fig. 5. The circuit is as follows: from transformer T, conductor 34, magnet 67, brush 63, shaft 60, projection 64, brush 65, conductor 32, lamp 70, conductor 34 to transformer. The resistance of the lamp must be so high that the current in the circuit is not enough to operate the magnet 67. In the shown position of the parts, the lamp 70 will glow indicating that drafts are "on". However, if the drafts are off, the projection 64 will move away from brush 65 and the lamp will be extinguished.

The lamp 70 may be of usual construction as shown in Fig. 4. Its filament 71 is connected to the metal contact plates 72 and 73 which plates are attached to a base 74 of wood or other non-conducting material. This lamp may be located near the top of the casing, the casing being cut away, as shown, at 75. The lamp lies against the plate 13 with one of the contact plates 72 or 73 bearing thereagainst. The other is contacted by a metal bracket 76 connected with and conveniently supported on the binding post 28.

The lamp 70 gives off a certain small amount of heat, some of which is conducted to the thermometal and therefore raises its temperature slightly above that of the air of the apartment. This heating effect is very advantageous in securing closer regulation.

With thermostats of usual construction the contact points are set so as to require a temperature difference of 2 or 3 degrees Fahrenheit, and it is difficult to get a closer adjustment because closer adjustments may result in connecting the two contacts together. However, by the use of the present invention a very much closer adjustment can be secured without having a close adjustment of the contacts. Assuming that the contacts are set so that a three degree increase in temperature is required to cause the blade 19 to move from the contact 20 to the contact 21 and that the heat from the heater element 70 is sufficient to raise the temperature of the thermoresponsive element 18 two and three quarters degrees, it will be seen that the blade 19 will touch the contact 21 upon only one-fourth degree temperature difference, which is much closer than could be obtained otherwise. This result is of great practical benefit as it permits of cheaper and less precise construction without sacrificing accuracy of operation.

The invention is especially useful in connection with "snap action" thermal switches of the type shown for example in U. S. patent to Phelps #1,578,360. It has been found that a considerable temperature difference is required to operate such thermal switches. By using the supplemental heating element of the present invention the highly desirable snap action of such a device may be obtained without sacrificing sensitivity.

The heating effect can be secured in other suitable ways as by causing a current to flow through the thermoresponsive metal itself when the room temperature is below the desired normal. In this case, the amount of current must bear the proper relation to the resistance and cross-sectional area of the metal to give the heating effect desired.

What is claimed is:

1. Means for controlling the temperature of an apartment comprising a thermoresponsive element, a contact blade actuated thereby, contacts cooperating with said blade, a heat supply for said apartment, motor means for controlling said heat supply, said motor means being controlled by said circuits alternately to increase or reduce the heat supply, a local electric heat source for heating said element and switching means actuated by said motor means for controlling said local heat source.

2. In a thermostat for controlling circuits for increasing or decreasing a heat supply, terminals for a common conductor and two selective return conductors one for increasing the heat supply and the other for reducing the heat supply, and a heat source connected to the common terminal and to the terminal for the heat supply reducing conductor.

3. In a thermostat for controlling circuits for increasing or decreasing a heat supply, terminals for a common conductor and two selective return conductors one for increasing the heat supply and the other for reducing the heat supply, and a lamp connected to the common terminal and to the terminal for the heat supply reducing conductor, said lamp being supported by a bracket mounted on the heat supply reducing terminal.

4. Means for controlling the temperature of an apartment comprising a thermo responsive element, a contact blade actuated thereby, contacts cooperating with said blade, a heat supply for said apartment, motor means for controlling said heat supply, said motor means being controlled by said circuits alternately to increase or reduce the heat supply, a local electric heat source for heating said element and switching means under control of said thermo responsive element.

5. In a thermostat for controlling circuits for increasing or decreasing a heat supply, a common conductor and two selective return conductors one for increasing the heat supply and the other for reducing the heat supply, and an indicating lamp connected to the common conductor and to the heat supply reducing conductor.

6. In a thermostat for controlling circuits for increasing or decreasing a heat supply, a common conductor and two selective return conductors one for increasing the heat supply and the other for reducing the heat supply, terminals for said conductors, and a combined indicating lamp and local heat source connected to the common terminal and to the terminal for the heat supply reducing conductor, said lamp being supported by a bracket mounted on the heat supply reducing terminal.

7. A thermostat for controlling the temperature of an apartment comprising a thermoresponsive element, an electric circuit controlled by said element, means whereby said circuit serves to control a heat supply for said apartment, and a combined indicating lamp and local heat source for heating said element in series with said control circuit, said lamp having a sufficiently high resistance so that the current passed by the lamp is reduced to an amount which will not be effective to operate the heat supply controlling means.

8. A thermostat for controlling the temperature of an apartment comprising a thermoresponsive element, an electric circuit controlled by said element, means whereby said circuit serves to control a heat supply for said apartment, and a combined indicating lamp and local heat source for heating said element in series with said control circuit, said lamp having a sufficiently high resistance so that the current passed by the lamp is reduced to an amount which will not be effective to operate the heat supply controlling means, and means for short circuiting said lamp.

9. Means for controlling the supply of heat to an apartment comprising a thermoresponsive element, a contact blade actuated thereby, a contact, an electrical circuit comprising said blade and contact effective for reducing the supply of heat and a high resistance supplemental heat source connected in circuit between said blade and said contact and means for increasing the heat supply comprising a circuit closing device controlled by said blade.

10. A thermostat for controlling the temperature of an apartment comprising a thermoresponsive element, an electric circuit controlled by said element, means whereby said circuit serves to control a heat supply for said apartment and a combined indicating lamp and local heat source for heating said element, and means under the control of said thermoresponsive element for short circuiting said combined lamp and heat source when said element has reached a predetermined temperature.

11. Means for controlling the temperature of an apartment comprising a thermoresponsive element, an electric circuit controlled by said element, a motor released for operation by said circuit for causing a decrease of the heat supply for said apartment and a high resistance local heat source in said circuit for heating said element, and means for short circuiting said local heat source when said element has reached a predetermined temperature.

12. In a thermostat for controlling circuits for increasing or decreasing a heat supply, terminals for a common conductor and two selective return conductors one for increasing the heat supply and the other for reducing the heat supply, and a lamp connected to the common terminal and to the terminal for the heat supply reducing conductor, a thermoresponsive element, and a casing for said elements, said lamp being mounted in thermoconductive relation to said thermoresponsive element and so mounted that light from the lamp is visible outside the casing.

13. In a thermostat for controlling means for varying the supply of heat to an apartment, a thermoresponsive element, electric contact means operated thereby, a casing enclosing said thermoresponsive element and contact means formed with an aperture, a combined indicating lamp and supplemental heat source mounted in said aperture in thermoconductive relation to said thermoresponsive element and in such a position that light from the lamp is visible outside the casing.

14. In a thermostat for controlling means for varying the supply of heat to an apartment, a thermoresponsive element, electric contact means operated thereby, a casing enclosing said thermoresponsive element and contact means formed with an aperture, a combined indicating lamp and supplemental heat source mounted in thermoconductive relation to said thermoresponsive element, and in such a position relative to such aperture that light from the lamp is visible to an observer standing in front of and facing the thermostat.

15. In a thermostat for controlling means for varying the supply of heat to an apartment, a thermoresponsive element, electric contact means operated thereby, a casing enclosing said thermoresponsive element and contact means formed with an aperture, an indicating lamp mounted in such a position relative to said aperture that light from the lamp is visible to an observer standing in front of and facing the thermostat.

ALLEN A. DICKE.